(12) United States Patent
Purser

(10) Patent No.: US 7,756,976 B2
(45) Date of Patent: Jul. 13, 2010

(54) SYSTEMS AND METHODS FOR DENYING ROGUE DHCP SERVICES

(75) Inventor: Jimmy Ray Purser, Pleasant Prairie, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 11/084,440

(22) Filed: Mar. 18, 2005

(65) Prior Publication Data

US 2006/0212560 A1    Sep. 21, 2006

(51) Int. Cl.
*G06F 15/173* (2006.01)
(52) U.S. Cl. ..................................... 709/225
(58) Field of Classification Search .................. 709/225
See application file for complete search history.

(56) References Cited

U.S. PATENT DOCUMENTS

| | | | | |
|---|---|---|---|---|
| 5,699,500 | A * | 12/1997 | Dasgupta | 714/1 |
| 6,826,664 | B2 * | 11/2004 | Hocker et al. | 711/157 |
| 2003/0037163 | A1 * | 2/2003 | Kitada et al. | 709/236 |
| 2006/0155853 | A1 * | 7/2006 | Nesz et al. | 709/227 |

* cited by examiner

*Primary Examiner*—Nathan Flynn
*Assistant Examiner*—Jeong S Park

(57) ABSTRACT

Methods of controlling dynamic host control protocol (DHCP) communication on a network are presented including: receiving a data frame on a network switch; and if the data frame is a DHCP offer frame that is not received from an authorized DHCP server port, dropping the data frame. In some embodiments, methods further include if the data frame is not the DHCP offer frame, forwarding the data frame. In some embodiments, methods further include if the data frame is the DHCP offer frame that is received from the authorized DHCP server port, forwarding the data frame.

24 Claims, 4 Drawing Sheets

SYSTEMS AND METHODS FOR DENYING ROGUE DHCP SERVICES

BACKGROUND OF THE INVENTION

Networking and networking connectivity continues to evolve as demand for data services increase. Wireless connection points, for example, are beginning to proliferate in gathering centers like bookstores, coffee shops, and airports. In addition to public wireless connections point, both wired and wireless home networking has also increased in popularity as network technologies have become more accessible to users. In order to enable this level of connectivity, barriers to entry in terms of networking knowledge have been lowered by enabling technology to automatically configure a network. While the result is that more and more users may be able to create networks, this result is not without drawbacks.

One paradigm in computer networking is the concept that each computing device in a network requires a unique identifier. One example identifier is an IP address. An IP address may be used to identify a computing related device such as a node, a printer, a switch, etc. A network server uses IP addresses to keep track of all devices on a defined network. In early networking, IP addresses were manually entered for each device by a network administrator. However, as the number and type of network devices grew, so did the need for a more flexible solution for providing IP addresses.

Dynamic Host Configuration Protocol (DHCP) was developed to provide more flexible addressing. In particular, DHCP allowed the assignment of dynamic IP addresses to devices on a network. DHCP simplifies network administration because software keeps track of IP addresses rather than requiring a network administrator to manage the task. Early in the development of DHCP, DHCP servers that assigned IP addresses were expensive and required extensive IT knowledge to maintain. However, as access to data services have begun to proliferate, devices, such as wireless routers, switches, and hubs have all begun to offer DHCP server capability in order to simplify network configuration. When these devices are used in isolation, they provide users with an easy, straightforward DHCP service for configuring their individual networks. However, when one of these devices is used in connection with a larger network, the DHCP services offered may conflict with existing services. For example, use of a second DHCP server on an established networking having a DHCP server my result in duplicate IP addresses being assigned to different devices on a network which, in some cases, may result in disruption of service. Compounding the problem is that for many of these devices configured for consumer use, DHCP service is a default setting. Thus, these devices become rogue DHCP servers when used in parallel with an established network that potentially may disrupt network services. Therefore systems and methods for denying rogue DHCP services are presented herein.

SUMMARY OF INVENTION

Methods of controlling dynamic host control protocol (DHCP) communication on a network are presented including: receiving a data frame on a network switch; and if the data frame is a DHCP offer frame that is not received from an authorized DHCP server port, dropping the data frame. In some embodiments, methods further include if the data frame is not the DHCP offer frame, forwarding the data frame. In some embodiments, methods further include if the data frame is the DHCP offer frame that is received from the authorized DHCP server port, forwarding the data frame.

In other embodiments, methods of disabling a rogue dynamic host control protocol (DHCP) server processes on a DHCP enabled network are presented including: receiving a client frame on a DHCP enabled network switch; and if the client frame is a DHCP offer frame that is received from the rogue DHCP server, dropping the client frame thereby disabling rogue DHCP server processes on the DHCP enabled network. In some embodiments, methods further include if the client frame is not the DHCP offer frame, forwarding the client frame. In some embodiments, methods further include if the client frame is the DHCP offer frame that is not received from the rogue DHCP server port, forwarding the client frame.

In other embodiments, a rogue dynamic host control protocol (DHCP) server filter for use on a DHCP enabled network is presented including: a client frame receiving component for receiving a client frame on a DHCP enabled network switch; and a DHCP server identification component for determining whether the client frame is a DCHP offer frame that is received from a rogue DHCP server. In some embodiments, methods further include a data forwarding component for forwarding the client frame if the DHCP server identification component determines that the client frame is the DHCP offer frame that is not received from the rogue DHCP server. In some embodiments, methods further include a logging component configured to log an event in response to determining that the client frame is the DCHP offer frame that is received from the rogue DHCP server.

In other embodiments, a security enhanced network switch for controlling DHCP servers for use on a DHCP enabled network is presented including: a client frame receiving component for receiving a client frame on the security enhanced network switch; and a DHCP server identification component for determining whether the client frame is a DCHP offer frame that is received from a rogue DHCP server. In some embodiments, methods further include a data forwarding component for forwarding the client frame if the DHCP server identification component determines that the client frame is not the DHCP offer frame. In some embodiments, methods further include: a logging component configured to log an event in response to determining that the client frame is the DCHP offer frame that is received from the rogue DHCP server.

In other embodiments, a computer program product for use in conjunction with a computer system for disabling a rogue dynamic host control protocol (DHCP) server processes on a DHCP enabled network, the computer program product comprising a computer readable storage medium and a computer program mechanism embedded therein, the computer program mechanism is presented including: instructions for receiving a client frame on a DHCP enabled network switch; and if the client frame is a DHCP offer frame that is received from the rogue DHCP server, instructions for dropping the client frame thereby disabling rogue DHCP server processes on the DHCP enabled network. In some embodiments, methods further include if the client frame is not the DHCP offer frame, forwarding the client frame. In some embodiments, methods further include if the client frame is the DHCP offer frame that is not received from the rogue DHCP server port, forwarding the client frame. In some embodiments, methods further include instructions for logging an event in response to the dropping the client frame.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
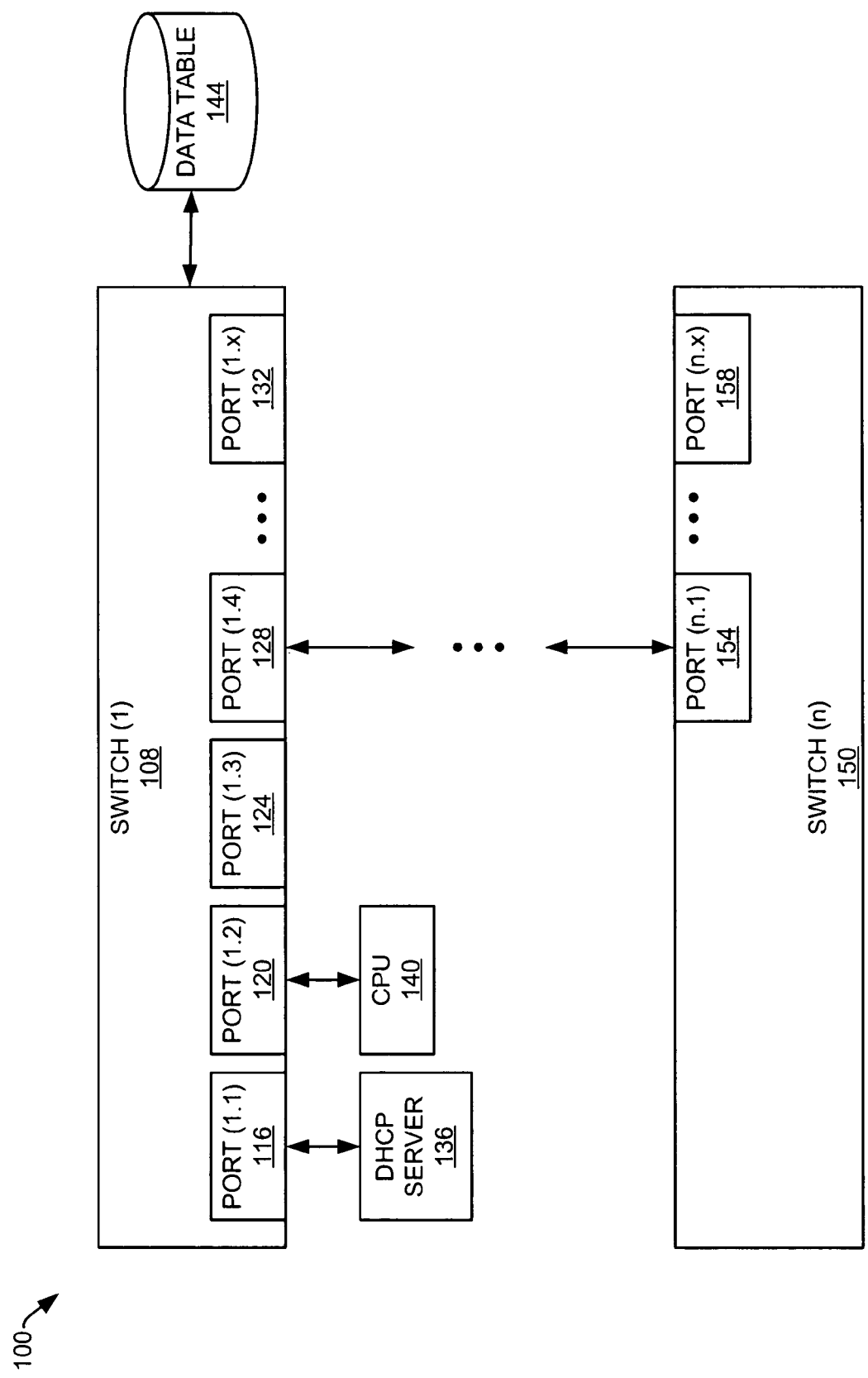
FIG. 1 is a graphical representation of a DHCP enabled environment in which embodiments of the present invention may be utilized.

Referring to FIG. 1, FIG. 1 is a graphical representation of a DHCP enabled environment 100 in which embodiments of the present invention may be utilized. An authorized DHCP server 136 may be connected with a switch 108. One function of an authorized DHCP server is to respond to a DHCP request. As noted above, DHCP is a protocol for assigning dynamic IP addresses to devices on a network. With dynamic addressing, a device can have a different IP address every time it connects to the network. In some systems, the device's IP address can even change while it is still connected. DHCP may also support a mix of static and dynamic IP addresses. Switch 108 may, among other functions, serve to correctly route data by tracking what device is connected to what port. Any number of ports 116-132 may be configured in a switch in accordance with user preferences. CPU 140 may be connected with switch 108. CPU 140 may, for example, be a node in a cluster, a user on a network, or a server without limitation. Any number of CPU's may connected with switch 108 in accordance with user preferences. In addition, switch 108 may include data table 144. Data table 144 may, in some embodiments contain switch configuration data including, for example, ports authorized to send DHCP offers.

Other devices may be connected with switch 108 such as printers, data storage devices, data readers, or any other network compatible device. In one embodiment, a second switch 150 having any number of ports 154-158 may be connected with switch 108. Switch 150 may be configured in a manner similar to switch 108. Any number of switches may be connected with switch 108 or switch 150 in accordance with user preferences. As can be appreciated, the illustrated switches are not intended to be limiting.

Figure 2:
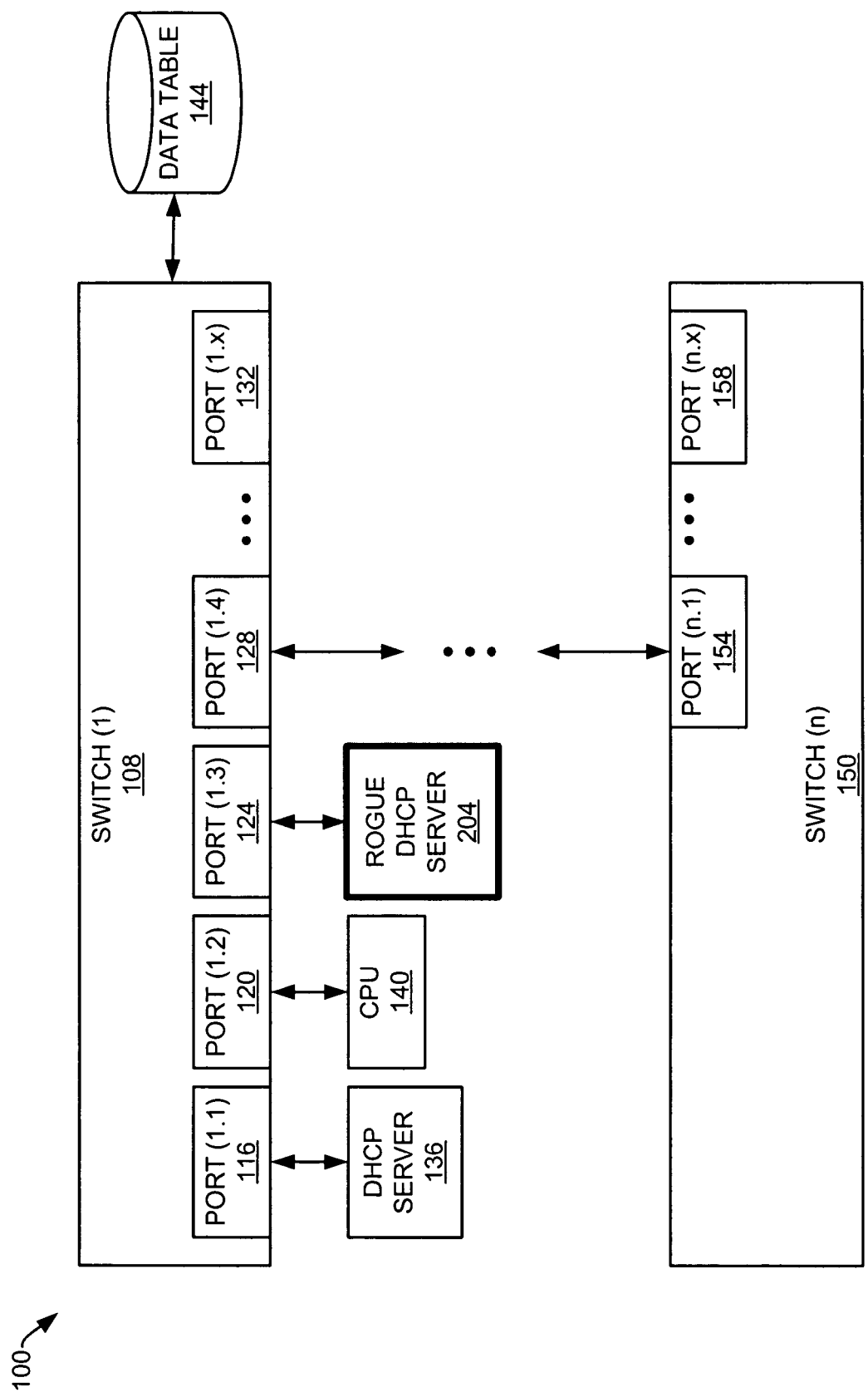
FIG. 2 is a graphical representation of a DHCP enabled environment including a rogue DHCP server in which embodiments of the present invention may be utilized.

Turning to FIG. 2, FIG. 2 is a graphical representation of a DHCP enabled environment 100 including a rogue DHCP server 204 in which embodiments of the present invention may be utilized. In particular, FIG. 2 illustrates rogue DHCP server 204 connected with switch 108 through port 124. As noted above, a rogue DHCP server is any DHCP server that is not configured as an authorized DHCP server. As can be appreciated, the method does not distinguish between malicious DHCP server devices and non-malicious DHCP server devices. That is, it is the functionality of the device which is under inspection rather than the intention of the device. In the example illustrated, rogue DHCP server 204, once connected with the illustrated network may begin to issue DHCP offers in response to DHCP requests. In some embodiments, duplicate IP addresses may occur that originate from authorized DHCP server 136 and rogue DHCP server 204. Methods for denying rogue DHCP services are described in further detail below for FIG. 4.

Figure 3:
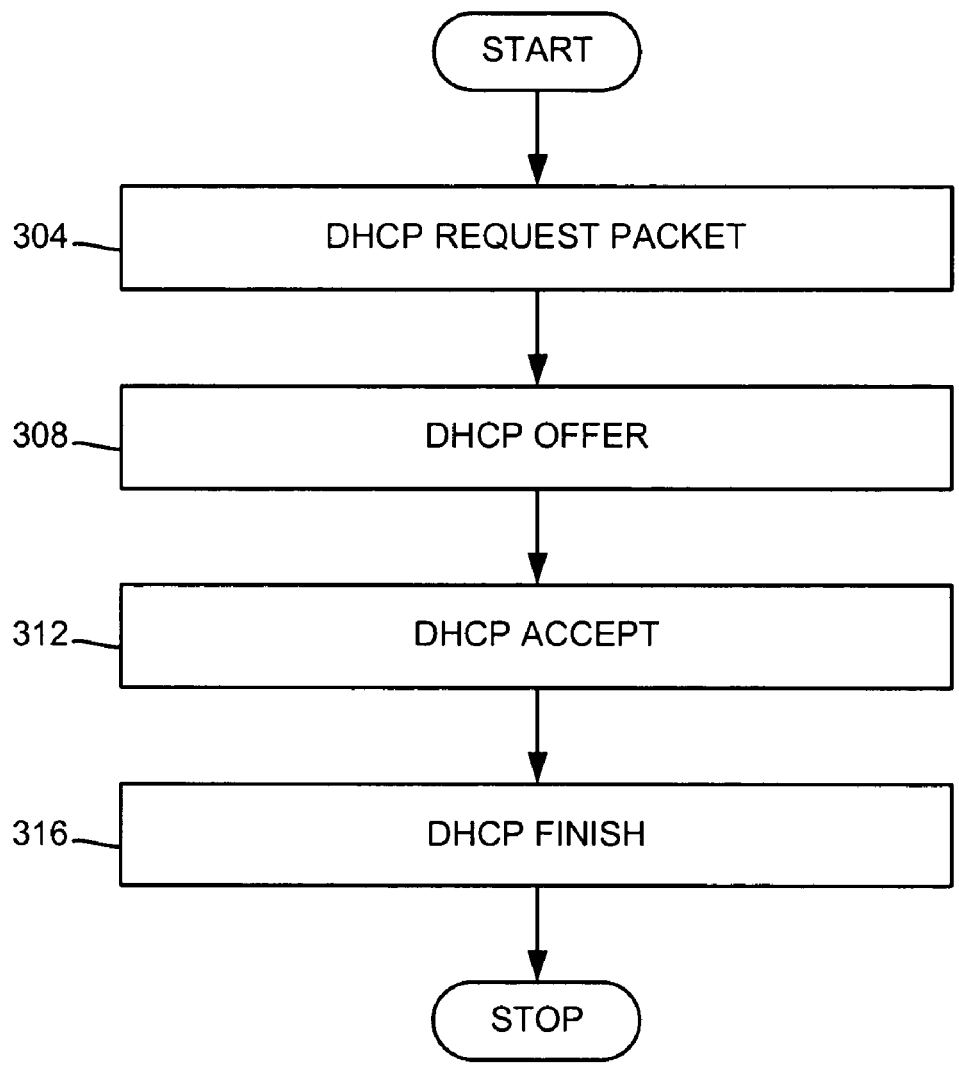
FIG. 3 is an illustrative flowchart of an example DHCP service in accordance with embodiments of the present invention.

Turning briefly to FIG. 3, FIG. 3 is an illustrative flowchart of an example DHCP service in accordance with embodiments of the present invention. Thus, at a first step 304, a DHCP request packet is generated in response to a new, unidentified device appearing on a network. A DHCP request packet is a request to a DHCP server to provide a valid IP address for a network. The DHCP request packet may typically be broadcast over a local network. At a next step 308, a DHCP offer may be generated in response to a DHCP request. A DHCP offer is made by a DHCP server. Because of programmatic limitations, any DHCP server on a network may answer a DHCP request. This allows for flexible configuration, but also allows multiple DHCP servers to populate a network.

At a next step 312, a DHCP acceptance may be generated. That is, a device may return a DHCP acceptance of a DHCP offer. In conventional systems, a rogue DHCP may be difficult to diagnose since valid DHCP offers may, in some instances, prevail over a rogue DHCP server. This may be particularly true where a rogue DHCP server is only intermittently powered up for use. As will be seen, one advantage of the present invention is that intermittently powered rogue DHCP servers generating intermittent DHCP services may be denied in embodiments of the present invention. At a next step 316, a DHCP finish may be generated. After DHCP offer is accepted, DHCP service for that device is no longer needed. Thus DHCP services for that DHCP request may be finished so as to reduce network overhead that might result if DHCP offers continued to flood the network in response to a DHCP request. The method then ends.

Figure 4:
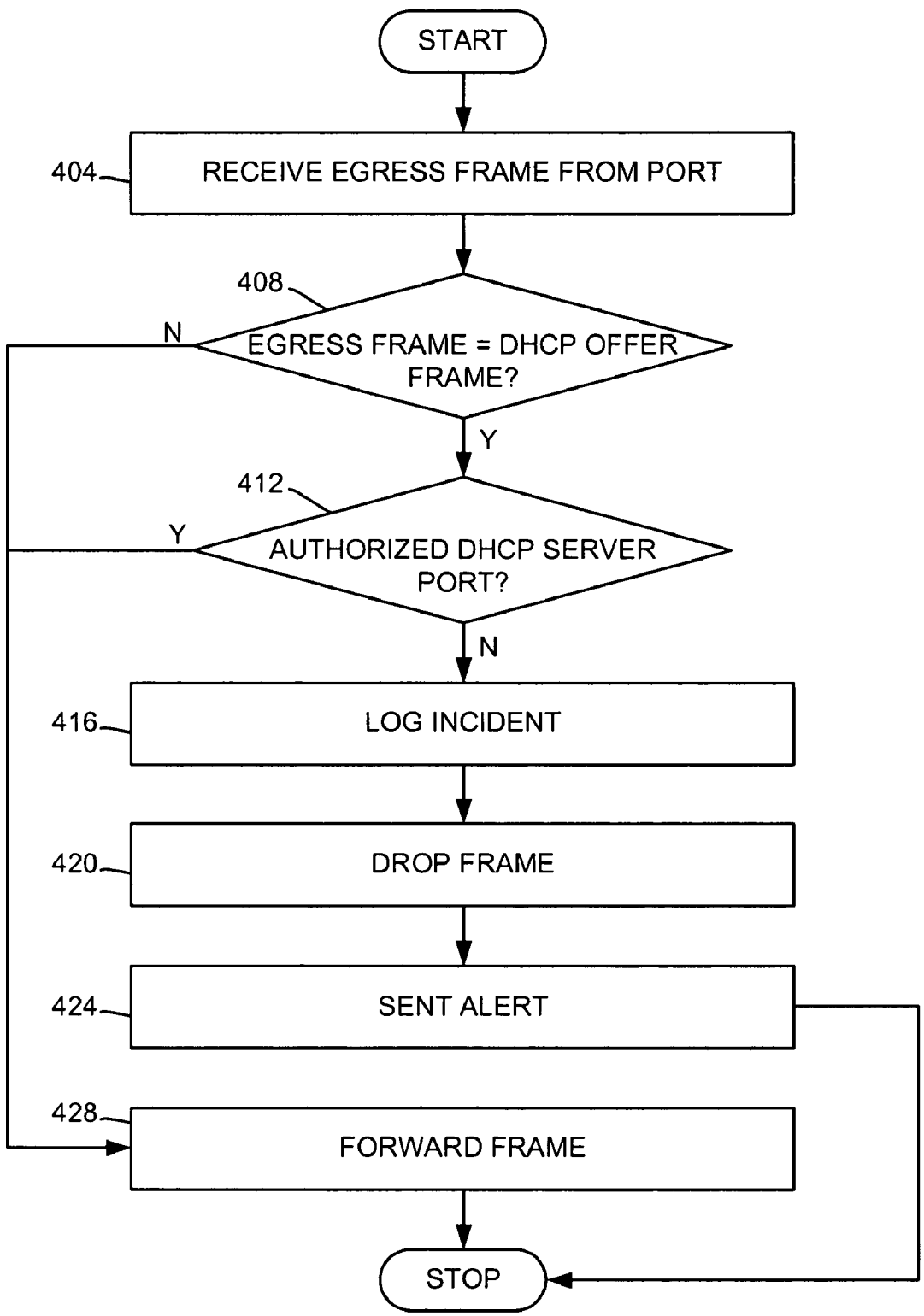
FIG. 4 is an illustrative flowchart of a method of denying rogue DHCP services in accordance with embodiments of the present invention.

Referring to FIG. 4, FIG. 4 is an illustrative flowchart of a method of denying rogue DHCP services in accordance with embodiments of the present invention. At a first step 404, an egress frame is received at a port on a switch. An egress frame is a frame leaving a device on a network. Typically, as noted above, a network may be configured with any number of switches and devices in accordance with user preferences. The methods described herein examine egress frames at a switch level in order to determine whether or not to allow the egress frame to continue being processed. Further, switch level examination may offer further network speed efficiencies. At a step 408, the method determines whether an egress frame is a DHCP offer frame. A DHCP offer frame may be configured as a type II frame. If the egress frame is not a DHCP offer frame, then the method forwards the frame at a step 428 whereupon the method ends. That is, all frames other than a DHCP offer frame are passed through the method.

If the method determines, at a step 408, that the frame is a DHCP offer frame, then the method determines whether the DHCP offer frame was received from an authorized port at a step 412. In some embodiments, the method may consult a table to determine whether a port is authorized to send DHCP offers. In other embodiments, the method may utilize a memory buffer to determine whether a port is authorized to send DHCP offers. If the method determines that the DHCP offer frame was received from an authorized DHCP server port, the method forwards the frame at a step 428 whereupon the method ends. If the DHCP offer frame was not received from an authorized DHCP server port, then the incident may be logged a step 416. The method may then drop the frame at a step 420 and send an optional alert at a step 424. The method then ends.

At least one additional benefit of the present invention takes advantage of some DHCP server configurations. For example, a DHCP server may be configured to hold in memory all DHCP offers until responses for those offers are received. In embodiments of the present invention, all rogue DHCP offers may be dropped. One result is that a rogue DHCP server may never receive a response from issued rogue DHCP offers and thus, must maintain, in memory, all rogue DHCP offers. Because of this characteristic, a rogue DHCP server's memory buffer may overflow, at which time the rogue DHCP server may no longer issue rogue DHCP offers. Thus, further rogue DHCP offers may, in some embodiments, terminate altogether.

While this invention has been described in terms of several embodiments, there are alterations, permutations, and equivalents, which fall within the scope of this invention. It should also be noted that there are many alternative ways of implementing the methods and apparatuses of the present invention. For example, although steps 416-424 are illustrated in a particular order, any order of those steps may be followed without departing from the present invention. Furthermore, embodiments have been described in conjunction with a switch on an packet switch enabled network, however, embodiments using the methods at, for example, a router, are also intended as enabled under the present invention. It is therefore intended that the following appended claims be interpreted as including all such alterations, permutations, and equivalents as fall within the true spirit and scope of the present invention.

What is claimed is:

1. A method of controlling dynamic host control protocol (DHCP) communication on a network comprising a plurality of DHCP servers, the method comprising:
   configuring each of the plurality of DHCP servers to hold in memory all DHCP offers made by the DHCP server and lacking a response from a network switch, wherein the network switch includes at least one physical port designated as a port authorized to send DHCP offer frames and at least one physical port designated as a port unauthorized to send DHCP offer frames;
   receiving a data frame at a physical port on the network switch;
   if the data frame is a DHCP offer frame, determining whether the physical port of the network switch receiving the data frame is an authorized physical port to send DHCP offer frames based on whether the physical port comprises the at least one physical port designated as a port authorized to send DHCP offer frames;
   in response to determining that the physical port is an authorized physical port to send DHCP offer frames, forwarding the received DHCP offer frame; and
   in response to determining that the physical port is not an authorized physical port to send DHCP offer frames, dropping the received DHCP offer frame.

2. The method of claim 1 further comprising:
   if the data frame is not a DHCP offer frame, forwarding the data frame.

3. The method of claim 1, wherein the holding in memory of all DHCP offers made by the DHCP servers and lacking a response from the network switch causes a memory buffer of a rogue DHCP server to overflow and to eventually stop issuing rogue DHCP offers at some point.

4. The method of claim 1 further comprising:
   logging an event in response to the dropping the data frame.

5. The method of claim 4 wherein the logging the event comprises:
   storing a flag type entry;
   storing a rogue DHCP port entry; and
   storing a timestamp entry for the event.

6. The method of claim 1 further comprising:
   generating an alert in response to the dropping the data frame.

7. The method of claim 1 wherein determining whether the physical port of the network switch is an authorized physical port to send DHCP offer frames is not based on an identity of a data source transmitting the DHCP offer frame to the physical port.

8. A method of disabling a rogue dynamic host control protocol (DHCP) server processes on a DHCP enabled network comprising a plurality of DHCP servers, the method comprising:
   configuring each of the plurality of DHCP servers to hold in memory all DHCP offers made by the DHCP server and lacking a response from a DHCP enabled network switch, wherein the DHCP enabled network switch includes at least one physical port designated as a port authorized to send DHCP offer frames and at least one physical port designated as a port unauthorized to send DHCP offer frames;
   receiving a client frame at a physical port on the DHCP enabled network switch;
   if the client frame is a DHCP offer frame, determining whether the physical port of the DHCP enabled network switch receiving the data frame is an authorized physical port to send DHCP offer frames based on whether the physical port comprises the at least one physical port designated as a port authorized to send DHCP offer frames; and
   in response to determining that the physical port is an authorized physical port to send DHCP offer frames, forwarding the received DHCP offer frame, wherein the network switch drops the received DHCP offer frame in response to determining that the physical port is not an authorized physical port to send DHCP offer frames.

9. The method of claim 8 further comprising:
   if the client frame is not a DHCP offer frame, forwarding the client frame.

10. The method of claim 8, wherein the holding in memory of all DHCP offers made by the DHCP servers and lacking a response from the DHCP enabled network switch causes a memory buffer of a rogue DHCP server to overflow at some point.

11. The method of claim 8 further comprising:
logging an event in response to the dropping the client frame.

12. The method of claim 11 wherein the logging the event comprises:
storing a flag type entry;
storing a designated port entry; and
storing a timestamp entry for the event.

13. The method of claim 8 further comprising:
generating an alert in response to the dropping the client frame.

14. A DHCP enabled network comprising:
a plurality of DHCP servers each configured to hold in memory all DHCP offers made by the DHCP server and lacking a response from a DHCP enabled network switch, wherein the DHCP enabled network switch includes at least one physical port designated as a port authorized to send DHCP offer frames and at least one physical port designated as a port unauthorized to send DHCP offer frames; and
the DHCP enabled network switch comprising:
a client frame receiving component for receiving a client frame at a physical port on the DHCP enabled network switch; and
a DHCP server identification component for determining whether the client frame is a DCHP offer frame and, if the client frame is a DHCP offer frame, determining whether the physical port of the DHCP enabled network switch receiving the data frame is an authorized port to send DHCP offer frames based on whether the physical port comprises the at least one physical port designated as a port authorized to send DHCP offer frames, wherein the DHCP enabled network switch is configured to drop the received DHCP offer frame in response to determining that the physical port is not an authorized physical port to send DHCP offer frames.

15. The DHCP enabled network of claim 14 further comprising:
a data forwarding component for forwarding the client frame if the DHCP server identification component determines that the client frame is a DHCP offer frame and the physical port is an authorized physical port to send DHCP offers.

16. The DHCP enabled network of claim 14 further comprising:
a logging component configured to log an event in response to determining that the client frame is a DCHP offer frame and that the physical port is not an authorized physical port to send DHCP offer frames.

17. The DHCP enabled network of claim 16 wherein the event comprises:
a flag type entry;
a designated port entry; and
a timestamp entry.

18. The DHCP enabled network of claim 14 further comprising:
a notification component configured to notify a user in response to determining that the client frame is a DCHP offer frame and that the physical port is not an authorized physical port to send DHCP offer frames.

19. A computer program product for use in conjunction with a computer system for disabling a rogue dynamic host control protocol (DHCP) server processes on a DHCP enabled network comprising a plurality of DHCP servers, the computer program product comprising a computer readable storage device and a computer program mechanism embedded therein, the computer program mechanism comprising:
instructions for configuring each of the plurality of DHCP servers to hold in memory all DHCP offers made by the DHCP server and lacking a response from a DHCP enabled network switch, wherein the DHCP enabled network switch includes at least one physical port designated as a port authorized to send DHCP offer frames and at least one physical port designated as a port unauthorized to send DHCP offer frames;
instructions for receiving a client frame at a physical port on the DHCP enabled network switch;
if the client frame is a DHCP offer frame, instructions for determining whether the physical port of the DHCP enabled network switch receiving the data frame is an authorized physical port to send DHCP offer frames based on whether the physical port comprises the at least one physical port designated as a port authorized to send DHCP offer frames; and
in response to determining that the physical port is not an authorized physical port to send DHCP offer frames, instructions for dropping the client frame thereby disabling rogue DHCP server processes on the DHCP enabled network.

20. The computer program product of claim 19, wherein the holding in memory of all DHCP offers made by the DHCP servers and lacking a response from the DHCP enabled network switch causes a memory buffer of a rogue DHCP server to overflow and to eventually stop issuing rogue DHCP offers at some point.

21. The computer program product of claim 19 further comprising instructions for:
if the client frame is a DHCP offer frame that is received from an authorized physical port to send DHCP offer frames, forwarding the client frame.

22. The computer program product of claim 19 further comprising:
instructions for logging an event in response to the dropping the client frame.

23. The computer program product of claim 22 wherein the instructions for logging the event comprises:
instructions for storing a flag type entry;
instructions for storing a designated port entry; and
instructions for storing a timestamp entry for the event.

24. The computer program product of claim 19 further comprising:
instructions for generating an alert in response to the dropping the client frame.

* * * * *

UNITED STATES PATENT AND TRADEMARK OFFICE
CERTIFICATE OF CORRECTION

PATENT NO. : 7,756,976 B2
APPLICATION NO. : 11/084440
DATED : July 13, 2010
INVENTOR(S) : Jimmy Ray Purser It is certified that error appears in the above-identified patent and that said Letters Patent is hereby corrected as shown below:

In column 7, line 31, in Claim 14, delete "DCHP" and insert -- DHCP --, therefor.

In column 7, line 53, in Claim 16, delete "DCHP" and insert -- DHCP --, therefor.

In column 8, line 4, in Claim 18, delete "DCHP" and insert -- DHCP --, therefor.

Signed and Sealed this
First Day of November, 2011

David J. Kappos
*Director of the United States Patent and Trademark Office*